No. 663,628. Patented Dec. 11, 1900.
J. W. HIETT.
WEEDER.
(Application filed Aug. 7, 1900.)
(No Model.)
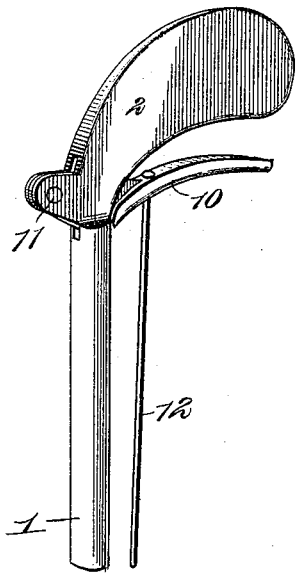
Fig. 1.
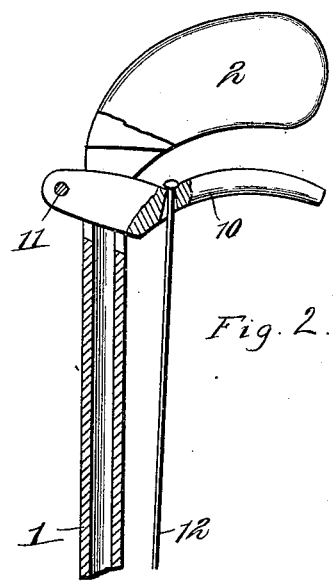
Fig. 2.
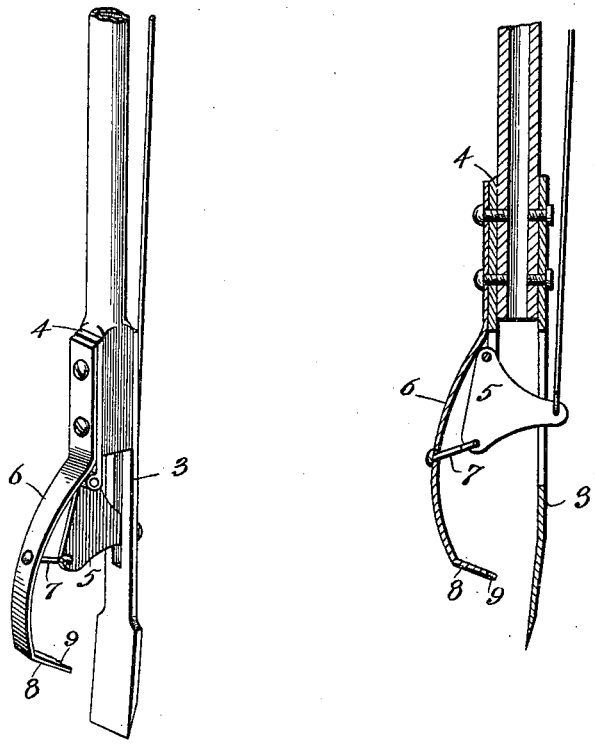
Witnesses.
J. W. Hiett. Inventor
by C. A. Snow & Co.
Attorneys

UNITED STATES PATENT OFFICE.

JEREMIAH W. HIETT, OF NORMAL, ILLINOIS.

WEEDER.

SPECIFICATION forming part of Letters Patent No. 663,628, dated December 11, 1900.

Application filed August 7, 1900. Serial No. 26,154. (No model.)

*To all whom it may concern:*

Be it known that I, JEREMIAH W. HIETT, a citizen of the United States, residing at Normal, in the county of McLean and State of Illinois, have invented a new and useful Weeder, of which the following is a specification.

My invention is an improved weeder; and it consists in the peculiar construction and combination of devices hereinafter fully set forth, and pointed out in the claims.

The object of my invention is to provide an improved implement which is especially adapted for uprooting and pulling up weeds from lawns, gardens, and the like, and which is exceedingly light and portable and may be used with one hand.

In the accompanying drawings, Figure 1 is a perspective view of a weeder constructed in accordance with my invention. Fig. 2 is a longitudinal sectional view of the same.

In the embodiment of my invention the handle 1, which is preferably of tubular form and of a suitable length and diameter, is provided at its upper end with a pistol-grip 2, adapted to be grasped by one hand. To the lower end of the handle 1, on one side thereof, is secured a blade 3, which is formed somewhat like a spade and is adapted to be employed for uprooting weeds—such as plantain, dandelion, milkweeds, thistles, and the like—from lawns and gardens. On the side of the handle opposite the blade 3 is secured a plate 4, to the lower end of which is fulcrumed a link-lever 5, which, as here shown, is triangular in form; but the form thereof may be modified at will. The plate 4 may be dispensed with and the connection for the link-lever formed integrally with the lower end of the handle, and practically the plate 4 forms merely an extension of the handle, to which the link-lever is fulcrumed. On the outer side of the plate 4, and therefore to the lower end of the handle on the side opposite the blade 3, is secured a spring-jaw 6, which is connected with the link-lever by a suitable link or other device, as at 7. The spring-jaw is adapted to open and close with relation to the blade 3, which forms a rigid jaw, and the engaging outer lip 8 of the spring-jaw is serrated, as at 9, whereby the same is adapted, in connection with the rigid jaw, to grasp the stalk of a weed after the same has been uprooted by the blade 3.

An operating-lever 10, which is in the form of a trigger, is fulcrumed to the upper end of the handle, as at 11, and the said trigger-lever is adapted to be closed against the pistol-grip 2 by the fingers of the hand which grasps the pistol-grip. A rod 12 connects the trigger-lever 10 with the link-lever 5, and thereby communicates power to the spring-jaw 6 to close the same.

A weeder thus constructed is exceedingly light and portable, may be carried and used by one hand and without the necessity of stooping down, may be manufactured at slight cost, and is especially adapted for use in ridding lawns of weeds.

I do not desire to limit myself to the precise construction and combination of devices herein shown and described, as it is obvious that modifications may be made therein without departing from the spirit of my invention.

The blade 3 may be employed either for uprooting weeds, as hereinbefore stated, or for cutting their roots below the ground, the spring-jaw and blade 3 coacting to grip the top of the weed at about the surface of the ground and admitting of the top of the weed and the major portion of the root being readily dislodged. Certain kinds of weeds are as effectually destroyed in this manner as by entirely uprooting them, and the implement may be used for both purposes.

Having thus described my invention, I claim—

1. A weeder comprising a handle, an uprooting-blade attached to the lower end thereof and forming a rigid jaw, a spring-jaw attached to the handle on the side opposite said rigid jaw, a link-lever, fulcrumed to the lower end of the handle, disposed between the said rigid and spring jaws and connected to the latter, a trigger-lever at the upper end of the handle, and a rod connecting said trigger-lever with said link-lever, substantially as described.

2. A weeder comprising a handle having a pistol-grip at its upper end, an uprooting-blade attached to the lower end of said handle and forming a rigid jaw, a spring-jaw attached to the handle on the side opposite said rigid jaw, a link-lever fulcrumed to the lower end of said handle disposed on the inner side of and connected to said spring-jaw, a trigger-lever at the upper end of the handle and adapted to close against the pistol-grip thereof, and a rod connecting said trigger-lever with the link-lever, substantially as described.

In testimony that I claim the foregoing as my own I have hereto affixed my signature in the presence of two witnesses.

JEREMIAH W. HIETT.

Witnesses:
   B. H. McCANN,
   A. C. COWLES.